United States Patent
Uoshita

(10) Patent No.: US 12,391,346 B2
(45) Date of Patent: Aug. 19, 2025

(54) OBSTRUCTION ZONE GENERATION DEVICE AND METHOD

(71) Applicant: Furuno Electric Co., Ltd., Nishinomiya (JP)

(72) Inventor: Seiichi Uoshita, Nishinomiya (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 30 days.

(21) Appl. No.: 18/196,435

(22) Filed: May 12, 2023

(65) Prior Publication Data

US 2023/0399082 A1 Dec. 14, 2023

(30) Foreign Application Priority Data

Jun. 9, 2022 (EP) .................................... 22178158

(51) Int. Cl.
*B63B 43/18* (2006.01)
*B63B 49/00* (2006.01)
*B63B 79/40* (2020.01)
*G08G 3/02* (2006.01)

(52) U.S. Cl.
CPC .............. *B63B 43/18* (2013.01); *B63B 49/00* (2013.01); *B63B 79/40* (2020.01); *G08G 3/02* (2013.01)

(58) Field of Classification Search
CPC ......... B63B 43/18; B63B 49/00; B63B 79/40; G08G 3/02
See application file for complete search history.

(56) References Cited

U.S. PATENT DOCUMENTS

| 5,515,287 A * | 5/1996 | Hakoyama ............ G01S 13/937 701/400 |
| 7,768,443 B2 | 8/2010 | Imazu et al. |
| 10,317,513 B2 * | 6/2019 | Nakahama ................ G01S 7/12 |

(Continued)

FOREIGN PATENT DOCUMENTS

| WO | 2020/008776 A1 | 1/2020 |
| WO | 2021/149448 A1 | 7/2021 |

(Continued)

OTHER PUBLICATIONS

Kayano et al., "On the Evaluation of Ship Maneuvering for Collision Avoidance by Using OZT", IEEE, 2011, pp. 195-200.

(Continued)

*Primary Examiner* — John A Tweel, Jr.
(74) *Attorney, Agent, or Firm* — XSENSUS LLP

(57) ABSTRACT

An obstruction zone generation device for a movable body includes a calculation information generation module to generate calculation information based on sensor information acquired by one or more information acquisition devices, an obstruction zone calculation module to calculate an obstacle zone by target (OZT) for each target ship of one or more target ships and generate OZT information, a mask area determination module to determine for each target ship of the one or more target ships whether to mask the OZT of the respective target ship in the OZT information based on a direction of the respective target ship and generate output information, and a display information generation module configured to generate OZT display information for displaying the OZT of the one or more target ships based on the output information and the OZT information.

11 Claims, 5 Drawing Sheets

(56) References Cited

U.S. PATENT DOCUMENTS

| | | | |
|---|---|---|---|
| 2009/0315756 A1* | 12/2009 | Imazu | B63B 49/00 342/41 |
| 2017/0284809 A1* | 10/2017 | Tanaka | G08G 3/02 |
| 2019/0137624 A1* | 5/2019 | Goto | G08G 3/02 |
| 2022/0348297 A1 | 11/2022 | Nakagawa | |

FOREIGN PATENT DOCUMENTS

| | | |
|---|---|---|
| WO | 2022/085355 A1 | 4/2022 |
| WO | 2022/091646 A1 | 5/2022 |
| WO | 2022/102323 A1 | 5/2022 |
| WO | 2022/113610 A1 | 6/2022 |
| WO | 2022/230332 A1 | 11/2022 |
| WO | 2022/234712 A1 | 11/2022 |
| WO | 2022/239401 A1 | 11/2022 |
| WO | 2022/239402 A1 | 11/2022 |
| WO | 2022/249631 A1 | 12/2022 |
| WO | 2022/249632 A1 | 12/2022 |
| WO | 2022/264550 A1 | 12/2022 |
| WO | 2023/276307 A1 | 1/2023 |

OTHER PUBLICATIONS

Fukuto et al., "New collision alarm algorithm using obstacle zone by target (OZT)", 9th IFAC Conference on Control Applications in Marine Systems, The International Federation of Automatic Control, Sep. 17-20, 2013, pp. 91-96.

Kayano et al., "Effectiveness of the OZT taking into account with the Other Ships' Waypoints Information", IFSA-SCIS 2017, Jun. 27-30, 2017, 5 pages.

Kuwahara et al., "Research and Development of Collision Risk Decision Method for Safe Navigation and Its Verification", Research and Development of Collision Risk Decision Method for Safe Navigation and Its Verification, ClassNK Technical Journal No. 3, 2021, pp. 13-40.

* cited by examiner

OBSTRUCTION ZONE GENERATION DEVICE AND METHOD

CROSS-REFERENCE TO RELATED APPLICATION(S)

The application claims priority under 35 U.S.C. § 119 to European Patent Application No. EP22178158.6, which was filed in Europe on Jun. 9, 2022, the entire disclosure of which is hereby incorporated by reference in its entirety.

TECHNICAL FIELD

The present disclosure mainly relates to a marine navigation system for safely navigating a ship, and more specifically to an obstruction zone generation device and method for safely navigating a ship by avoiding collisions with surrounding obstacles.

BACKGROUND

Marine navigation systems and navigation devices require detection of nearby target obstacles for safely navigating an own ship from one point to another. These conventional navigation systems and devices have been used for tracking and identifying a position of target obstacles and other ships including one's own ship (or vessel). Additionally, these conventional systems measure a distance corresponding to intruding target obstacles and utilize the measurement of the distance at a closest point of approach. In such systems, radar indicators, reflection plotters, and plotting tables are often used for measuring the distance corresponding to the target obstacles and the closet point of approach. However, even small errors in plotting may seriously degrade a reliability of these conventional systems, which may result in a collision Furthermore, an existing conventional system attempted to address the aforementioned problems by displaying all target obstacles, such as target ships, terrains, and other target objects, that are present within a predetermined range on a screen of a display for safely navigating the own ship. The existing conventional system calculates an obstacle zone by targets (OZTs) of the respective target ships within the predefined range, based on a course and a speed of corresponding target ship and a course and a speed of the own ship, and displays all the target obstacles that are present within the predetermined range on the screen of the display based on the calculated OZTs. In addition, the existing conventional system also indicates potential areas of collision with a plurality of target symbols, icons, and indices on the screen of the display.

However, a vessel navigating personnel, for example, captain, crew, or other navigating officers on-board the ship may overlook the screen and fail to identify the target ships that are to be avoided from all the target obstacles displayed on the screen, leading to problems in the secure navigation of the ship. Especially, a plurality of target symbols in addition to OZTs of the respective target ships are displayed on the same screen, thereby degrading the visibility of important target obstacles that are to be avoided. Thus, the vessel navigating personnel may be unable to safely navigate the ship. For the aforementioned reasons, there is a need for providing a system and method that overcomes the problems of the existing conventional systems and facilitates the vessel navigating personnel to safely navigate the own ship by avoiding collisions with the target ships and other obstacles.

SUMMARY

In an embodiment of the present disclosure, there is provided an obstruction zone generation device that includes a calculation information generation module, an obstruction zone calculation module, a mask area determination module, a display information generation module. The calculation information generation module is configured to generate calculation information based on sensor information acquired by one or more information acquisition devices. The calculation information is required to calculate an obstacle zone by target (OZT) for each target ship of one or more target ships. The obstruction zone calculation module is configured to calculate the OZT for each target ship of the one or more target ships, and generate OZT information. The OZT information includes the calculated OZT of each target ship of the one or more target ships. The mask area determination module is configured to determine for each target ship of the one or more target ships whether to mask the OZT of the respective target ship in the OZT information based on a direction of the respective target ship and generate output information. The display information generation module is configured to generate OZT display information for displaying the OZT of the one or more target ships based on the output information and the OZT information.

Additionally, or optionally, the calculation information includes at least one of: speed information, course information, direction information, and distance information of the own ship and each target ship of the one or more target ships.

Additionally, or optionally, the obstruction zone calculation module calculates the OZT for each target ship based on a course, a heading direction, and a speed of corresponding target ship, a course, a heading direction, and a speed of the own ship, and a distance between the own ship and the corresponding target ship.

Additionally, or optionally, the calculation information generation module is further configured to generate display information based on the sensor information acquired by the one or more information acquisition devices.

Additionally, or optionally, the display information includes a position of the own ship, a heading direction of the own ship, a position of the one or more target ships, and a course of the one or more target ships.

Additionally, or optionally, the display information includes information associated with at least one of: the one or more target ships, a terrain in a region surrounding the own ship, and one or more target objects in the region surrounding the own ship.

Additionally, or optionally, the one or more information acquisition devices include at least one of: a global navigation satellite system (GNSS) compass, an angular velocity sensor, a GNSS receiver, an acceleration sensor, an automatic identification system (AIS) receiver, an electronic chart display and information system (ECDIS), a plotter, a radio detection and ranging device (RADAR), an automatic radar plotting aid (ARPA), and a sound navigation and ranging (SONAR) device.

Additionally, or optionally, the mask area determination module is further configured to mask corresponding OZTs of the respective target ships which are located farther than the respective target ships that have a same heading direction as the own ship.

Additionally, or optionally, the output information includes a set of masked areas corresponding to the OZT of respective target ships that are required to be masked in the OZT information.

Additionally, or optionally, each masked area of the set of masked areas has at least one of: a triangular shape, a rectangular shape, and a trapezoidal shape.

Additionally, or optionally, the OZT display information is displayed on a screen of a display, thereby facilitating a ship operator to identify a positional relation between the own ship and the OZT of respected target ship on the screen of the display.

In another aspect of the present disclosure, there is provided an obstruction zone generation method. The obstruction zone generation method includes, generating calculation information based on the sensor information acquired by the one or more information acquisition devices, calculating the OZT for each target ship of the one or more target ships, to generate OZT information, wherein the OZT information includes the calculated OZT of each target ship of the one or more target ships, determining for each target ship of the one or more target ships whether to mask the OZT of the respective target ship in the OZT information based on a direction of the respective target ship, to generate output information, and generating OZT display information for displaying the OZT of the one or more target ships based on the output information and the OZT information.

In yet another aspect of the present disclosure, there is provided a non-transitory computer readable medium having stored thereon computer-executable instructions which, when executed by a computer, cause the computer to generate calculation information based on sensor information acquired by one or more information acquisition devices, wherein the calculation information is required to calculate an OZT for each target ship of the one or more target ships, calculate the OZT for each target ship of the one or more target ships to generate OZT information, wherein the OZT information includes the calculated OZT of each target ship of the one or more target ships, determine for each target ship of the one or more target ships whether to mask the OZT of the respective target ship in the OZT information based on a direction of the respective target ship to generate output information, and generate OZT display information for displaying the OZT of the one or more target ships based on the output information and the OZT information.

The problem of not being able to display visual information that can be intuitively used by the vessel navigating personnel to navigate the ship safely on the planned route is solved by using an obstruction zone generation device that determines for each target ship of the one or more target ships whether to mask the OZT of the respective target ship based on a direction of the respective target ship and selectively displays potentially hazardous target ships that are to be avoided on the planned route. Accordingly, the obstruction zone generation device of the present disclosure allows the vessel navigating personnel, i.e., a user who operates the own ship to identify the positional relation between the own ship and the target ship as well as the OZT of respected target ships on a screen of a display.

BRIEF DESCRIPTION OF DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein:

DETAILED DESCRIPTION OF THE EMBODIMENTS

Figure 1:
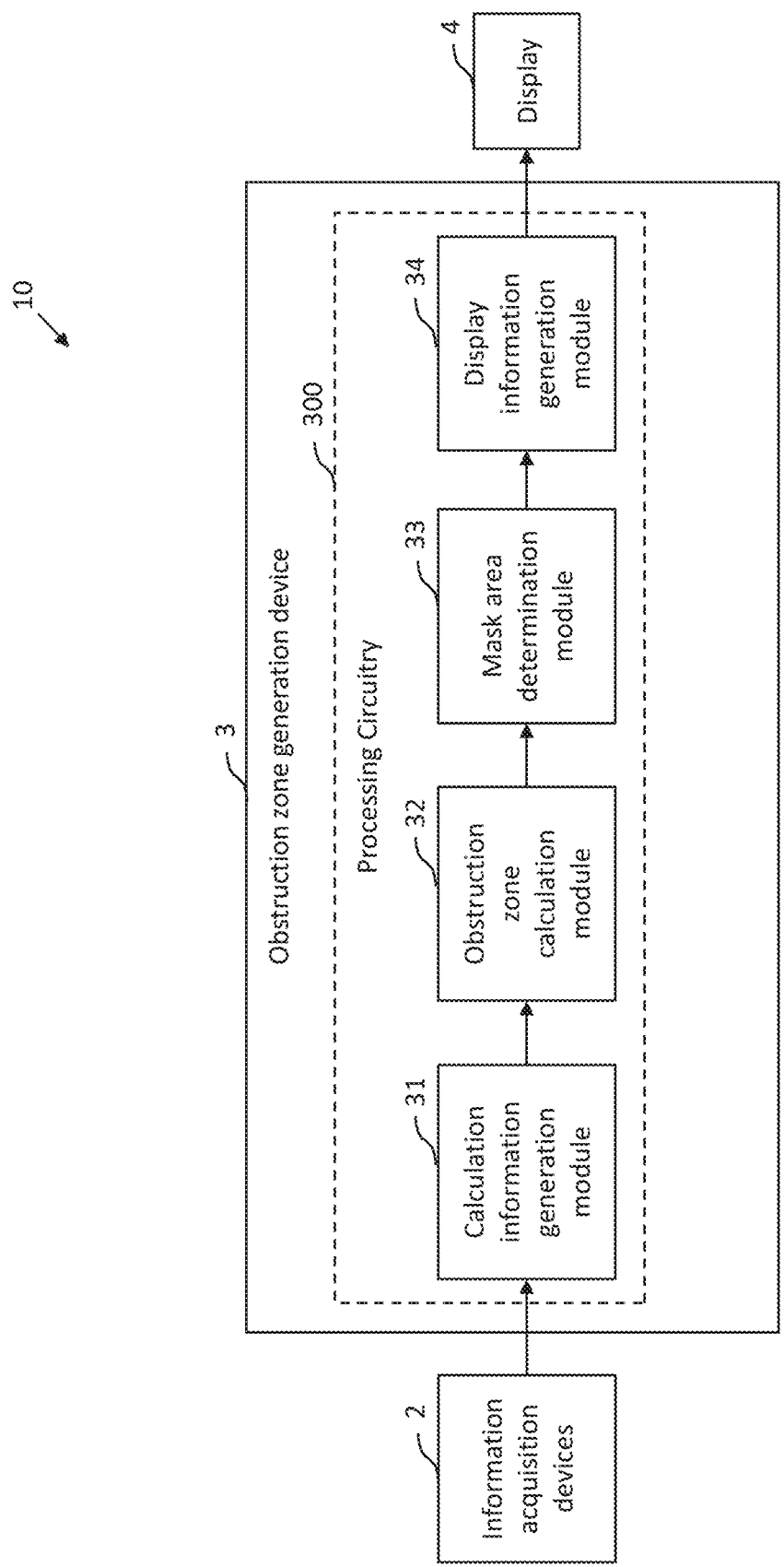
FIG. 1 is a block diagram illustrating a configuration of a navigation device for safely navigating a movable body according to one embodiment of the present disclosure.

Example apparatus are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Figure 2:
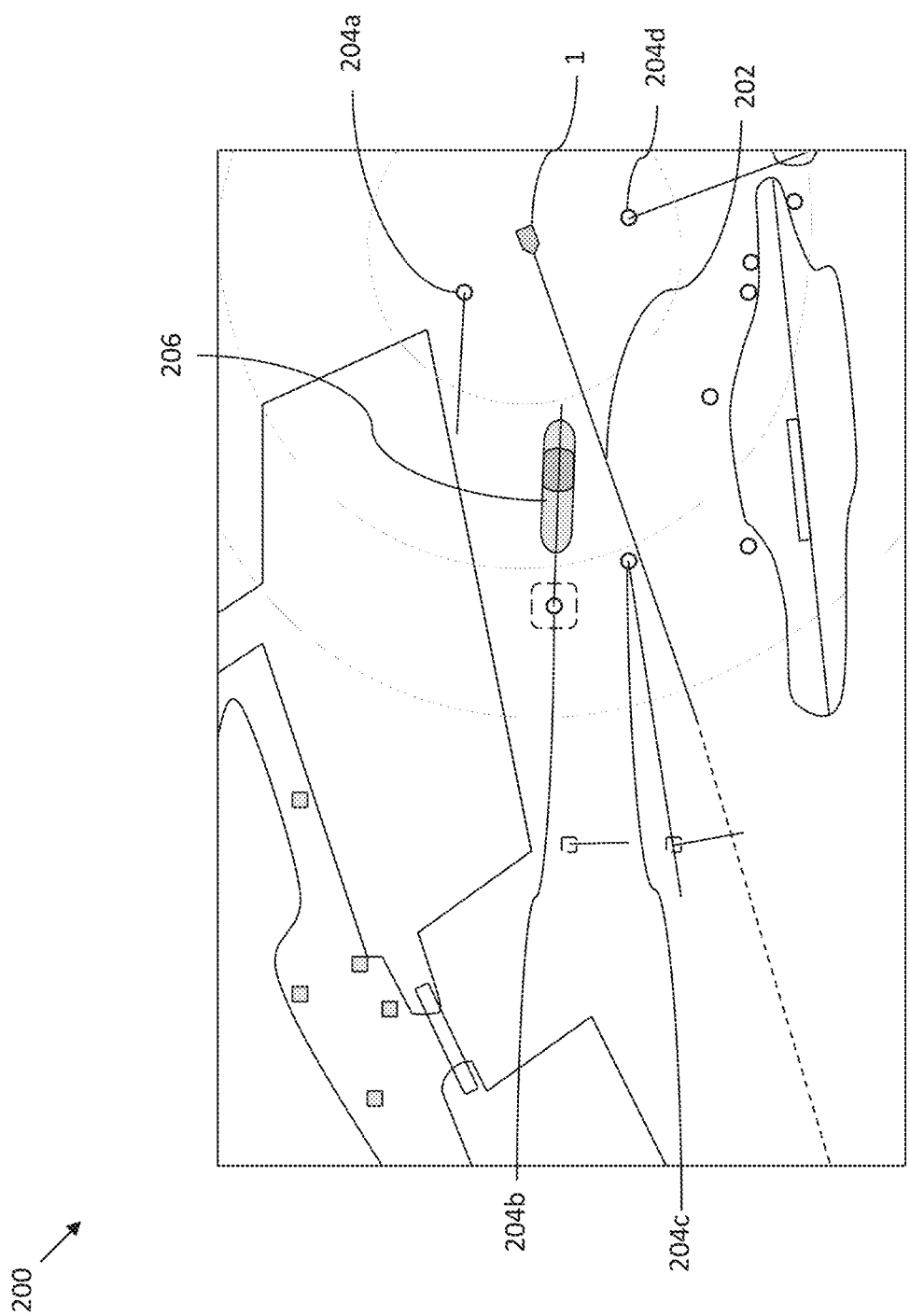
FIG. 2 illustrates an image of a region surrounding the movable body.

FIG. 1 is a block diagram illustrating a configuration of a navigation device 10 for safely navigating a movable body 1 (hereinafter also referred to as an "own ship 1"), according to one embodiment of the present disclosure. FIG. 2 illustrates an image 200 of a region surrounding the own ship 1.

Next mainly referring to FIG. 1, the navigation device 10 may be mounted on the own ship 1 for navigation of the own ship 1 from a source location to a destination location. Once the voyage has begun, the navigation of the own ship 1 along a planned route 202 that is a path to be followed by the own ship 1 between the source location and the destination location must be monitored. The navigation device 10 is configured to be used for safely navigating the own ship 1 by avoiding collisions with surrounding obstacles such as, but not limited to, target ships, terrains, and other target objects. A ship operator, i.e., a user who operates the own ship 1, navigates the own ship 1 along the planned route 202 with assistance of the navigation device 10. In one embodiment, as illustrated in FIG. 2, the planned route 202 is a path to be followed by the own ship 1 to navigate and safely reach the destination location.

The navigation device 10 includes one or more information acquisition devices 2, an obstruction zone generation device 3, and a display 4. The one or more information acquisition devices 2 may correspond to one or more conventional maritime electronics devices. The one or more information acquisition devices 2 include at least one of: a global navigation satellite system (GNSS) compass, an angular velocity sensor, a GNSS receiver, an acceleration sensor, an automatic identification system (AIS) receiver, an electronic chart display and information system (ECDIS), a plotter, a radio detection and ranging (RADAR) device, an automatic radar plotting aid (ARPA), a sound navigation and ranging (SONAR) device, and the like. The one or more information acquisition devices 2 acquire sensor information that includes at least one of: a position, a speed, a course, an angular velocity, and a heading direction of the own ship 1, and information regarding one or more obstacles surrounding the own ship 1. In one embodiment, the one or more obstacles surrounding the own ship 1 may be at least one of: one or more target ships 204a-204d, terrains, or one or more target objects.

With continued reference to FIG. 1, the obstruction zone generation device 3 includes a calculation information generation module 31, an obstruction zone calculation module 32, a mask area determination module 33, and a display information generation module 34. The calculation information generation module 31, the obstruction zone calculation module 32, the mask area determination module 33, and the display information generation module 34 can be implemented as processing circuitry 300.

Referring now to FIGS. 1 and 2, the calculation information generation module 31 may be configured to generate calculation information based on the sensor information acquired by the one or more information acquisition devices 2. Based on the acquired sensor information, the calculation information generation module 31 generates the calculation information of the own ship 1 and each target ship of the one or more target ships 204a-204d. In one embodiment, the calculation information generation module 31 may be operably coupled with, and hence in communication with, one or more sensors and/or indicators, such as a direction sensor, a speed indicator, and the like that may be included in the one or more information acquisition devices 2 of the own ship 1. The calculation information is required to calculate an obstacle zone by target (OZT) for each target ship of the one or more target ships 204a-204d as illustrated in FIG. 2. The OZT indicates a collision zone on corresponding target ship's course where there is a potential risk of collision with a nearby ship, i.e. the own ship 1. The calculation information includes at least one of: speed information, course information, direction information, and distance information of the own ship 1 and each target ship of the one or more target ships 204a-204d.

The speed information indicates the speed of the own ship 1 and a speed of each target ship of the one or more target ships 204a-204d. In one embodiment, the speed information indicates the speed of the own ship 1 and each target ship of the one or more target ships 204a-204d in real-time. In another embodiment, the speed information indicates the speed of the own ship 1 and each target ship of the one or more target ships 204a-204d at pre-defined time intervals. The course information indicates the course of the own ship 1 and a course of each target ship of the one or more target ships 204a-204d. The direction information indicates the heading direction of the own ship 1 and a heading direction of each target ship of the one or more target ships 204a-204d. The distance information indicates a distance between the own ship 1 and each target ship of the one or more target ships 204a-204d.

The calculation information generation module 31 generates display information based on the sensor information acquired by the one or more information acquisition devices 2. The display information includes the position of the own ship 1, the heading direction of the own ship 1 in the planned route 202, a position of the one or more target ships 204a-204d, and the course of the one or more target ships 204a-204d. In addition, the display information may also include information associated with at least one of: the one or more target ships 204a-204d, a terrain in a region surrounding the own ship 1, and the one or more target objects in the region surrounding the own ship 1.

In one embodiment, the calculation information generation module 31 may directly acquire the calculation information and the display information from the one or more information acquisition devices 2. In another embodiment, the calculation information generation module 31 may generate the calculation information and the display information by processing calculations such as measurement, calculation, or estimation, based on the sensor information acquired by the one or more information acquisition devices 2.

The obstruction zone calculation module 32 may be operably coupled with, and hence in communication with the calculation information generation module 31. The obstruction zone calculation module 32 receives the calculation information from the calculation information generation module 31 for calculating the OZT for each target ship of the one or more target ships 204a-204d. The obstruction zone calculation module 32 is configured to calculate the OZT for each target ship of the one or more target ships 204a-204d and OZT information. The OZT for each target ship 204a-204d is calculated based on the calculation information. The OZT information includes the calculated OZT of each target ship of the one or more target ships 204a-204d. The OZT indicates a region in which the own ship 1 reaches the same location at the same time as the target ships with a highest probability. The OZT is calculated using the speed information, the course information, the direction information, and the distance information of the own ship 1 and the respective target ships 204a-204d. In one embodiment, the obstruction zone calculation module 32 calculates the OZT for each target ship based on a course, a heading direction, and a speed of corresponding target ship, the course, the heading direction, and the speed of the own ship 1, and the distance between the own ship 1 and the corresponding target ship.

Figure 3A:
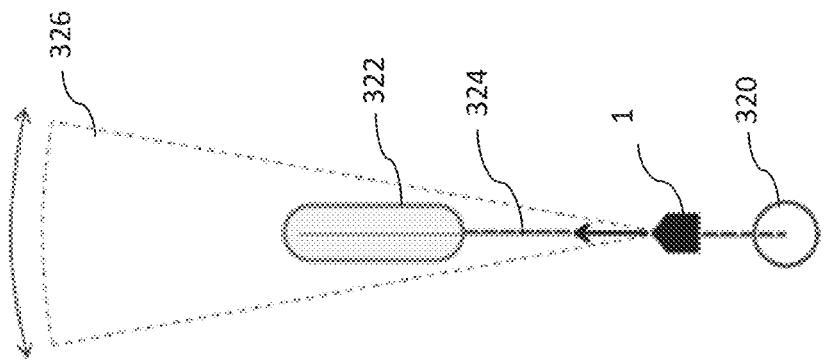
FIGS. 3A, 3B, and 3C respectively illustrate exemplary obstruction zone by target (OZT) information of target ships including an OZTs of the respective target ships.

FIG. 3A illustrates exemplary OZT information of a target ship 302 including an OZT 304 of the target ship 302, according to one embodiment of the present disclosure. The obstruction zone calculation module 32 may determine an azimuth angle 306 associated with the own ship 1 and the target ship 302. The azimuth angle 306 is an angular measurement between the heading direction of the own ship 1 and a straight line between the own ship 1 and the target ship 302. In one example, if the target ship 302 is sailing along a predicted future path 308 as shown in the FIG. 3A and the own ship 1 continues to sail in the current heading direction, then there will be a higher risk of collision. The obstruction zone calculation module 32 calculates the OZT 304 of the target ship 302 based on the speed information, the course information, the direction information, and the distance information of the own ship 1 and the target ship 302. In one embodiment, the obstruction zone calculation module 32 calculates the OZT 304 of the target ship 302 further based on the azimuth angle 306. Based on the calculated OZT 304, the obstruction zone calculation module 32 determines a dangerous course 310 that is a path in which the risk of collision between the own ship 1 and the target ship 302 is high. If the own ship 1 continues to sail in the dangerous course 310 there will be a greater risk of collision. In one embodiment, the OZT information associated with the target ship 302 includes the calculated OZT 304, the azimuth angle 306, the predicted future path 308, and the dangerous course 310.

Figure 3B:
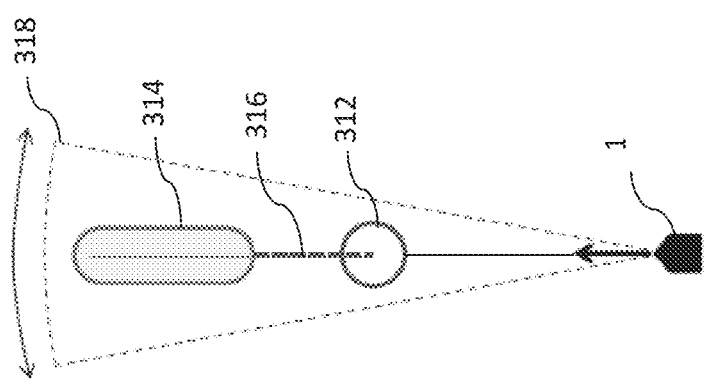
Figure 3C:
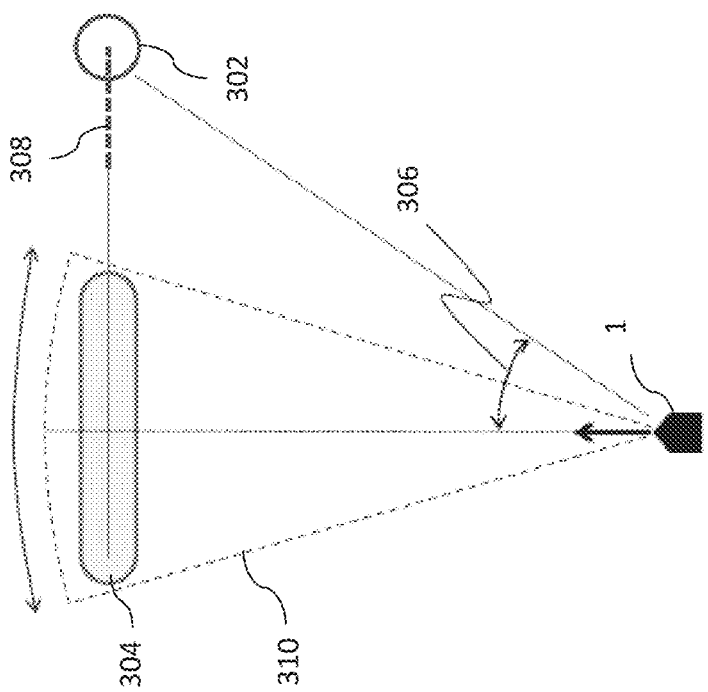

FIG. 3B illustrates exemplary OZT information of a target ship 312 including an OZT 314 of the target ship 312, according to one embodiment of the present disclosure. In one example, if the target ship 312 is sailing along a predicted future path 316 and the own ship 1 continues to sail in the current direction as shown in the FIG. 3B, then there will be a higher risk of collision. The obstruction zone calculation module 32 calculates the OZT 314 of the target ship 312 based on the speed information, the course information, the direction information, and the distance information of the own ship 1 and the target ship 312. Based on the calculated OZT 314, the obstruction zone calculation module 32 determines a dangerous course 318 that is a path in which the risk of collision is high. If the own ship 1 continues to sail in the dangerous course 318 there will be a greater risk of collision. In one embodiment, the OZT information associated with the target ship 312 includes the calculated OZT 314, the predicted future path 316, and the dangerous course 318. FIG. 3C is similar to FIG. 3B but shows target ship 320 behind the own ship 1, with a predicted future path 324 on a same course as the own ship. The following description of FIG. 3C is the same as for FIG. 3B, but different drawing element labels are applied to the target ship, predicted path, OZT, and dangerous course to reflect the different scenario in FIG. 3C. The obstruction zone calculation module 32 calculates the OZT 322 of the target ship 320 based on the speed information, the course information, the direction information, and the distance information of the own ship 1 and the target ship 320. Based on the calculated OZT 322, the obstruction zone calculation module 32 determines a dangerous course 326 that is a path in which the risk of collision is high. If the own ship 1 continues to sail in the dangerous course 326 there will be a greater risk of collision.

It will be apparent to a person skilled in the art that the obstruction zone calculation module 32 generates the OZT information for each target ship of the one or more target ships 204a-204d in a manner similar to the generation of the OZT information as described in FIGS. 3A and 3B.

Referring now to FIG. 1, the mask area determination module 33 is configured to determine for each target ship of the one or more target ships 204a-204d whether to mask the OZT of the respective target ship based on a direction of the respective target ship in the OZT information and generate output information. For example, the mask area determination module 33 is configured to mask the OZT of a corresponding ship having a heading direction same as the heading direction of the own ship 1 and does not mask the OZT of a corresponding ship having a heading direction opposite to the heading direction of the own ship 1.

The mask area determination module 33 may determine a risk of collision between the own ship 1 and each target ship of the one or more target ships 204a-204d. The risk of collision is determined based on the position information, the direction information, and the speed information of the own ship 1 and each target ship of one or more target ships 204a-204d. In one embodiment, the determination of whether to mask the OZT of the respective target ship is further based on the determined risk of collision. In one embodiment, the mask area determination module 33 masks the respective target ships' OZTs, such as OZTs of the target ships 204a, 204c, and 204d, which have headings that do not intersect a vector corresponding to the direction of the own ship 1. The mask area determination module 33 determines whether the own ship 1 has a risk of collision with the closest forward target ships, such as the target ship 204b, having the estimated heading direction opposite to the heading direction of the own ship 1. If the mask area determination module 33 determines that the own ship 1 has a risk of collision with the target ship 204b, the OZT of the target ship 204b is not masked. The heading direction of the own ship 1 may be estimated based on the sensor information acquired by the one or more information acquisition devices 2. The output information thus includes a set of masked areas corresponding to the OZT of respective target ships 204a, 204c, and 204d that are required to be masked in the OZT information.

For example, if the target ships 204a, 204c, and 204d are sailing in the same direction as the own ship I and the target ship 204b is sailing in an opposite direction with respect to the own ship's direction, then the mask area determination module 33 generates the output information including the set of masking areas corresponding to the OZTs of the target ships 204a, 204c, and 204d.

Figure 4:
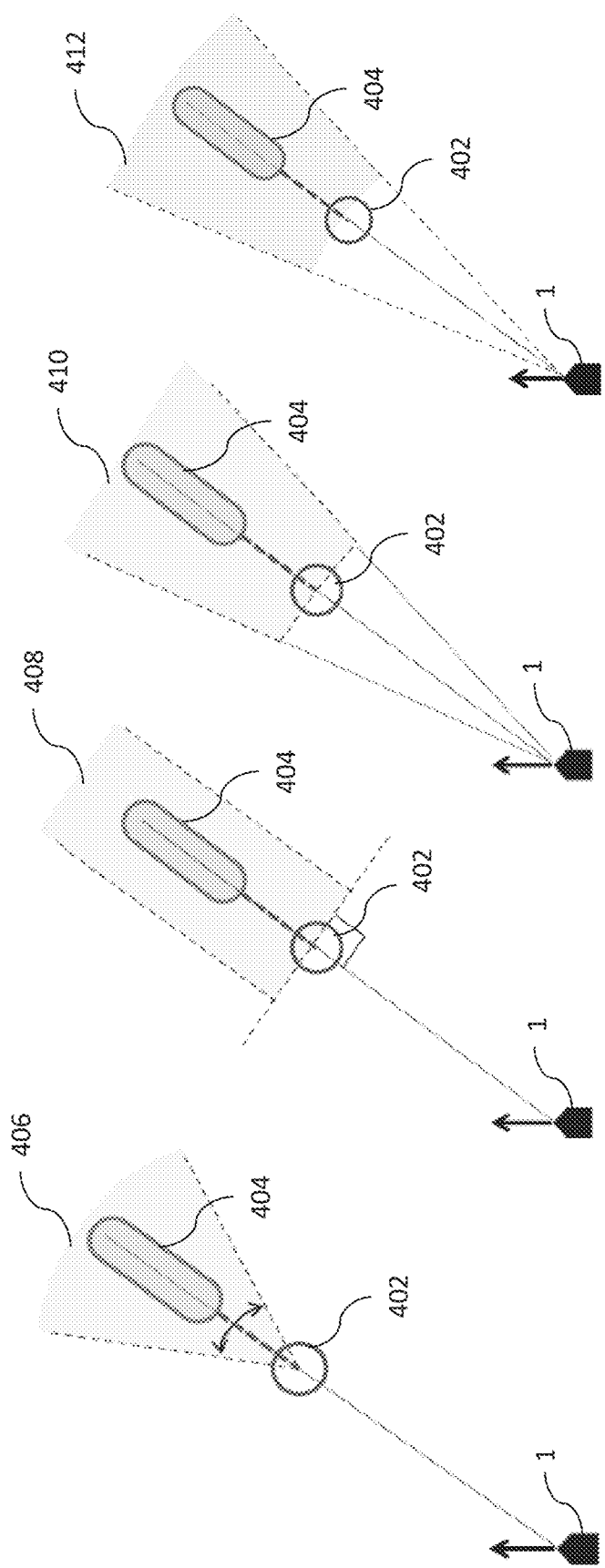
FIG. 4 illustrates exemplary masks for an OZT of a target ship that need to be masked.

FIG. 4 illustrates exemplary masks for an OZT 404 of a target ship 402 that need to be masked. The mask area determination module 33 determines for the target ship 402 whether to mask the OZT 404 of the target ship 402 based on a direction of the target ship 402 in the OZT information and generates the output information. In one embodiment, the mask area determination module 33 determines to mask the OZT 404 of the target ship 402. The output information includes a set of masked areas corresponding to the OZTs of the respective target ships, such as the OZT 404 of the target ship 402 that is required to be masked in the OZT information. In one embodiment, each masked area of the set of masked areas has at least one of, but not limited to, a triangular shape, a rectangular shape, and a trapezoidal shape. For example, the mask area determination module 33 may mask the OZT 404 of the target ship 402 using one of: a triangular shape masked area 406, a rectangular shape masked area 408, or a trapezoidal shape masked area 410, or a curve ended trapezoidal shape masked area 412.

It will be understood by a person skilled in the art that the mask area determination module 33 generates the output information including corresponding masked areas for the target ships 204a, 204c, and 204d that may be one of: a triangular, rectangular, or a trapezoidal shape masked area. Further, the present disclosure is applicable not only to the ship which travels on the sea, but may also be applicable to arbitrary water-surface movable bodies which can travel, for example, on a lake, or a river.

Referring to FIGS. 1 and 2 together, the display information generation module 34 is configured to generate OZT display information based on the output information and the OZT information to display the OZT display information on a screen of the display 4 required for safe navigation of the own ship 1 and avoid collision with obstacles in the surrounding region of the own ship 1. The display information generation module 34 receives the output information from the mask area determination module 33. For example, as the target ships 204a, 204c, and 204d have headings that do not have headings that do not intersect a vector corresponding to the direction of the own ship 1, the OZTs of the respective target ships 204a, 204c, and 204d are masked in the OZT information and thus are not shown on the screen of the display 4.

Further, as the target ship 204b is travelling in the opposite direction as the own ship 1 and has a higher risk of collision, the OZT 206 of the target ship 204b is displayed on the screen of the display 4 as illustrated in the FIG. 2. Thus, the ship operator can easily identify the positional relation between the own ship I and the target ship 204b as well as the OZT 206 of the respective target ship 204b on the screen of the display 4. The ship operator can avoid collisions with the target ship 204b by navigating the own ship I through a different course to avoid the OZT 206 of the target ship 204b.

Thus, it will be apparent to a person skilled in the art that some of the OZTs in the OZT information that correspond to target ships having no risk of collision are masked and other OZTs in the OZT information that correspond to target ships having a risk of collision with the own ship 1 are not masked and hence included in the OZT display information, thereby displaying only the required information on the screen of the display 4 for collision avoidance.

The display 4 may be located on-board the own ship 1 and provided with, or in electrical connection to, the obstruction zone generation device 3 on the own ship 1, as the ship instrument for purposes as will be explained in detail later herein. The display 4 is configured to display the one or more target ships that are to be avoided for avoiding the risk of collision. The display 4 may be configured as, for example, a display screen that forms part of a navigation assisting device to which a ship operator, i.e., a user, who operates the own ship 1 refers. However, the display 4 is not limited to the above configuration, and, for example, it may be a display screen for a portable computer which is carried by a ship operator's assistant who monitors the surrounding situation from the own ship 1, a display screen for a passenger to watch in the cabin of the own ship 1, or a display part for a head mounted display, such as a wearable glass, worn by a passenger.

Figure 5:
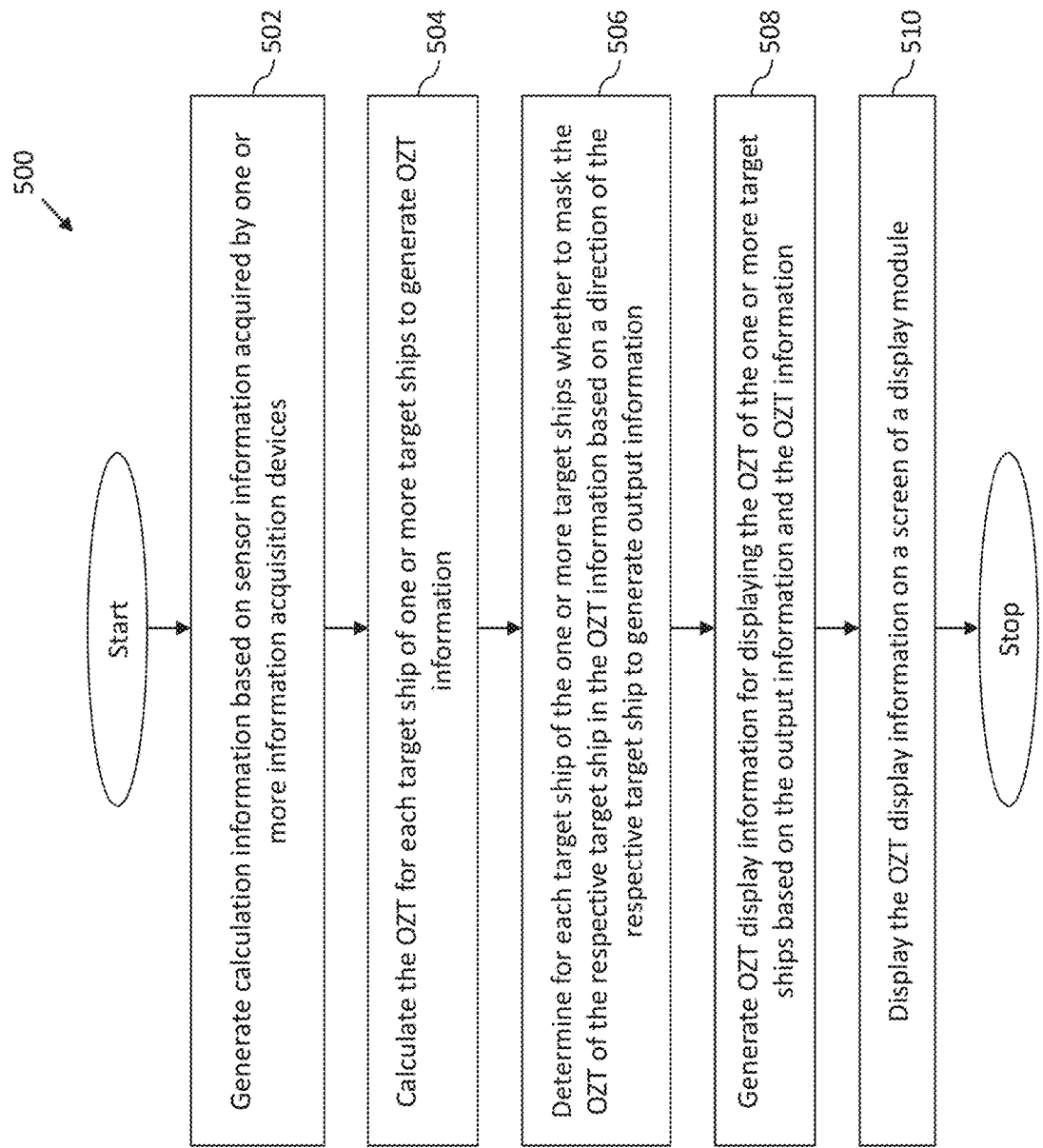
FIG. 5 is a flow chart illustrating an obstruction zone generation method in accordance with an embodiment of the present disclosure.

FIG. 5 is a flow chart illustrating an obstruction zone generation method 500 in accordance with an embodiment of the present disclosure.

At step 502, the calculation information generation module 31 generates the calculation information based on the sensor information acquired by the one or more information acquisition devices 2. The calculation information is required to calculate the OZT for each target ship of the one or more target ships 204a-204d.

At step 504, the obstruction zone calculation module 32 calculates the OZT for each target ship of the one or more target ships 204a-204d to generate the OZT information. The OZT information includes the calculated OZT of each target ship of the one or more target ships 204a-204d. In addition, the calculation information generation module 31 is configured to generate display information based on the sensor information acquired by the one or more information acquisition devices 2.

At step 506, the mask area determination module 33 determines for each target ship of the one or more target ships 204a-204d whether to mask the OZTs of the respective target ships 204a-204d based on a direction of the respective target ship in the OZT information to generate the output information. The mask area determination module 33 masks the OZTs of the respective target ships, which have headings that do not have headings that do not intersect a vector corresponding to the direction of the own ship 1. The output information includes a set of masked areas corresponding to the OZTs of the respective target ships that are required to be masked in the OZT information.

At step 508, the display information generation module 34 generates OZT display information based on the output information and the OZT information, for displaying the OZT display information on the screen of the display 4 required for safe navigation of the own ship 1 and avoid collision with obstacles in the surrounding region of the own ship 1. The display information generation module 34 receives the output information and the OZT information from the mask area determination module 33.

At step 510, the display 4 is configured to display the OZT display information on the screen of the display 4. Thus, the ship operator, i.e., a user, who operates the own ship 1 can easily identify the positional relation between the own ship 1 and the target ships as well as the OZTs of the respective target ships on the screen of the display 4. The ship operator can avoid collisions with the target ship 204b by navigating the own ship 1 on a different course to avoid the OZTs of the respective target ships that are to be avoided.

Terminology

It is to be understood that not necessarily all objectives or advantages may be achieved in accordance with any particular embodiment described herein. Thus, for example, those skilled in the art will appreciate that certain embodiments may be configured to operate in a manner that achieves or optimizes one advantage or group of advantages as taught herein without necessarily achieving other objects or advantages as may be taught or suggested herein.

All processes described herein may be embodied in, and fully automated via, software code modules executed by a computing system that includes one or more computers or processors. The software code modifies may be stored in any type of non-transitory computer-readable medium or other computer storage device. Some or all methods may be embodied in specialized computer hardware.

Many other variations other than those described herein will be apparent from this disclosure. For example, depending on the embodiment, certain actions, events, or functions of any of the algorithms described herein may be performed in different sequences, and may be added, merged, or excluded altogether (e.g., not all described actions or events are required to execute the algorithm). Moreover, in certain embodiments, operations or events are performed in parallel, for example, through multithreading, interrupt handling, or through multiple processors or processor cores, or on other parallel architectures, rather than sequentially. In addition, different tasks or processes can be performed by different machines and/or computing systems that can work together.

The various exemplary logical blocks and modules described in connection with the embodiments disclosed herein can be implemented or executed by a machine such as a processor. The processor may be a microprocessor, but alternatively, the processor may be a controller, a microcontroller, or a state machine, or a combination thereof. The processor can include an electrical circuit configured to process computer executable instructions. In another embodiment, the processor includes an application specific integrated circuit (ASIC), a field programmable gate array (FPGA), or other programmable device that performs logical operations without processing computer executable instructions. The processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, the processor may also include primarily analog components. For example, some or all of the signal processing algorithms described herein may be implemented by analog circuitry or mixed analog and digital circuitry. A computing environment may include any type of computer system, including, but not limited to, a computer system that is based on a microprocessor, mainframe computer, a digital signal processor, a portable computing device, a device controller, or a computing engine within the device.

Unless otherwise stated, conditional languages such as "can," "could," "will," "might," or "may" are understood within the context as used in general to convey that certain embodiments include, while other embodiments do not include, certain features, elements and/or steps. Thus, such conditional languages are not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive languages, such as the phrase "at least one of X, Y, or Z," unless specifically stated otherwise, is understood with the context as used in general to present that an item, term, etc., may be either X, Y, or Z, or any combination thereof (e.g., X, Y, and/or Z). Thus, such a disjunctive language is not generally intended to, and should not, imply that certain embodiments require at least one of X, at least one of Y, or at least one of Z to each be present.

Any process descriptions, elements, or blocks in the flow diagrams described herein and/or shown in the accompanying drawings should be understood as potentially representing modules, segments, or parts of code, including one or more executable instructions for implementing a particular logical function or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under" are defined with respect to the horizontal plane.

As used herein, the terms "attached," "connected," "coupled," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An obstruction zone generation device configured to be installed on a ship, comprising:
    processing circuitry configured to:
    generate calculation information based on sensor information acquired by one or more information acquisition devices associated with the ship,
    wherein the calculation information includes each of:
        a speed of the ship,
        information about a direction of the ship, the direction including at least one of:
            a course of the ship, and
            a heading direction of the ship, and
        a distance between the ship and a target ship that has been sensed by the one or more information acquisition devices;
    based on the calculation information, determine each of:
        a heading direction of the target ship,
        an obstacle zone by target (OZT) for the target ship, and
        a mask area corresponding to the OZT; and
    based on the determined heading direction of the target ship, selectively display the OZT of the target ship or mask the OZT of the target ship with the mask area such that:
        the OZT of the target ship is displayed along a first vector corresponding to the heading direction of the target ship only when the first vector intersects a second vector corresponding to the direction of the ship, and
        the OZT of the target ship is masked by the mask area only when the first vector does not intersect the second vector.

2. The obstruction zone generation device according to claim 1, wherein:
    the processing circuitry calculates the OZT for each target ship based on each of:
    a course of the target ship,
    the heading direction of the target ship,
    a speed of the target ship,
    the course of the ship,
    the heading direction of the ship, and
    the speed of the ship, and
    the distance between the ship and the target ship.

3. The obstruction zone generation device according to claim 1, wherein:
    the processing circuitry is further configured to generate additional display information based on the sensor information acquired by the one or more information acquisition devices.

4. The obstruction zone generation device according to claim 3, wherein:
the additional display information includes each of:
information about a position of the ship,
information about the heading direction of the ship,
information about a position of the target ship, and
information about a course of the target ship.

5. The obstruction zone generation device according to claim 3, wherein:
the additional display information includes at least one of:
target ship information,
information about a terrain in a region surrounding the ship, and
information about one or more predetermined target objects in the region surrounding the ship.

6. The obstruction zone generation device according to claim 1, wherein:
the one or more information acquisition devices include at least one of:
a global navigation satellite system (GNSS) compass,
an angular velocity sensor,
a GNSS receiver,
an acceleration sensor,
an automatic identification system (AIS) receiver,
an electronic chart display and information system (ECDIS),
a plotter,
a radio detection and ranging device (RADAR),
an automatic radar plotting aid (ARPA), or
a sound navigation and ranging (SONAR) device.

7. The obstruction zone generation device according to claim 1, wherein:
the target ship is one of a plurality of target ships, and
the processing circuitry is further configured to mask corresponding OZTs of respective ones of the plurality of target ships which are determined by the processing circuitry as not having headings that intersect the course of the ship.

8. The obstruction zone generation device according to claim 7, wherein:
the processing circuitry is configured to generate a set of masked areas corresponding to OZTs of respective target ships that are determined by the processing circuitry as not having headings that do not intersect the direction of the ship.

9. The obstruction zone generation device according to claim 1, wherein:
the mask area has one of:
a triangular shape
a rectangular shape or
a trapezoidal shape,
the mask area is larger than the OZT, and
the mask area is centered over the OZT along a vector connecting the ship and the target ship.

10. An obstruction zone generation method performed by a device configured to be installed on a ship, the obstruction zone generation method comprising:
generating calculation information based on sensor information acquired by one or more information acquisition devices associated with the ship;
wherein the calculation information includes each of:
a speed of the ship,
information about a direction of the ship the direction including at least one of:
a course of the ship, and
a heading direction of the ship, and
a distance between the ship and a target ship that has been sensed by the one or more information acquisition devices;
based on the calculation information determining each of:
a heading direction of the target ship,
an obstacle zone by target (OZT) for the target ship, and
a mask area corresponding to the OZT; and
based on the determined heading direction of the target ship, selectively displaying the OZT of the target ship or masking the OZT of the target ship with the mask area such that:
the OZT of the target ship is displayed along a first vector corresponding to the heading direction of the target ship only when the first vector intersects a second vector corresponding to the direction of the ship, and
the OZT of the target ship is masked by the mask area only when the first vector does not intersect the second vector.

11. A non-transitory computer readable medium having stored thereon computer-executable instructions which, when executed by a computer configured to be installed on a ship, cause the computer to:
generate calculation information based on sensor information acquired by one or more information acquisition devices associated with the ship,
wherein the calculation information includes each of:
a speed of the ship,
information about a direction of the ship, the direction including at least one of:
a course of the ship, and
a heading direction of the ship, and
a distance between the ship and a target ship that has been sensed by the one or more information acquisition devices:
based on the calculation information, determine each of:
a heading direction of the target ship,
an obstacle zone by target (OZT) for the target ship, and
a mask area corresponding to the OZT; and
based on the determined heading direction of the target ship, selectively display the OZT of the target ship or mask the OZT of the target ship with the mask area such that:
the OZT of the target ship is displayed along a first vector corresponding to the heading direction of the target ship only when the first vector intersects a second vector corresponding to the direction of the ship, and
the OZT of the target ship is masked by the mask area only when the first vector does not intersect the second vector.

* * * * *